US007177628B2

(12) United States Patent
Sommers et al.

(10) Patent No.: US 7,177,628 B2
(45) Date of Patent: Feb. 13, 2007

(54) METHOD FOR ENABLING IP PUSH CAPABILITY TO WIRELESS DEVICES ON A WIRELESS NETWORK

(75) Inventors: Daniel Sommers, Roswell, GA (US); Michelle Antonelli, Chicago, IL (US); Leonard Hinds, Alpharetta, GA (US); Patrenahalli Narendra, Barrington, IL (US); Ernest Pineault, Franklin, MA (US); Raul Pombo, Alpharetta, GA (US); Sidney Taylor, Roswell, GA (US)

(73) Assignee: Motorola, Inc., Schaumburg, IL (US)

( * ) Notice: Subject to any disclaimer, the term of this patent is extended or adjusted under 35 U.S.C. 154(b) by 773 days.

(21) Appl. No.: 10/393,737

(22) Filed: Mar. 21, 2003

(65) Prior Publication Data

US 2004/0185834 A1    Sep. 23, 2004

(51) Int. Cl.
*H04M 3/42* (2006.01)
(52) U.S. Cl. ............................ 455/414.1; 455/414.2; 455/414.3
(58) Field of Classification Search .. 379/88.11–88.13, 379/88.18, 88.25–88.26; 455/412.1–414.4, 455/466, 556.2
See application file for complete search history.

(56) References Cited

U.S. PATENT DOCUMENTS

| 5,646,982 A | * | 7/1997 | Hogan et al. ............ 379/88.22 |
| 5,751,791 A | * | 5/1998 | Chen et al. ............... 379/88.13 |
| 6,052,440 A | * | 4/2000 | Yuhn ....................... 379/88.13 |
| 6,144,644 A | * | 11/2000 | Bajzath et al. ............... 370/259 |
| 6,230,003 B1 | * | 5/2001 | Macor ...................... 455/412.2 |
| 6,418,307 B1 | * | 7/2002 | Amin ......................... 455/413 |
| 6,463,131 B1 | * | 10/2002 | French-St. George et al. ....................... 379/88.23 |
| 6,785,363 B2 | * | 8/2004 | Culliss ...................... 379/67.1 |
| 6,799,033 B2 | * | 9/2004 | Kanefsky ................. 455/412.1 |
| 6,826,264 B2 | * | 11/2004 | Valco et al. ............... 379/67.1 |
| 6,882,708 B1 | * | 4/2005 | Bedingfield et al. ..... 379/88.18 |

FOREIGN PATENT DOCUMENTS

EP          1 113631 A2  *  4/2001

* cited by examiner

*Primary Examiner*—Bing Q. Bui
(74) *Attorney, Agent, or Firm*—Bryan W. Bockhop; Bockhop & Associates

(57) ABSTRACT

A system and method for downloading information from a content server to a mobile device in communication with a wireless communication network. The mobile device is assigned a network address and registers with the content server by providing the network address as an identification information. The content server establishes a communication channel to the mobile device by opening a socket to the network address and downloads the information to the mobile device through the communication channel. If the content server cannot open a communication channel to the network address, the content server sends a message to the mobile device.

38 Claims, 7 Drawing Sheets

METHOD FOR ENABLING IP PUSH CAPABILITY TO WIRELESS DEVICES ON A WIRELESS NETWORK

BACKGROUND OF THE INVENTION

1. Field of the Invention

The present invention generally relates to wireless telecommunication. More specifically, the present invention relates to a method for delivering digital content to a wireless telecommunication device.

2. Description of the Related Art

The variety of wireless telecommunication devices is increasing with cellular telephones, personal digital assistants (PDAs), pagers, and other voice and data devices accessing terrestrial wireless networks. Most of these devices are equipped to receive data information such as emails and other text contents.

The most common way for a device to receive text data is for the device to request a server to download information to the device, i.e., the device initiates polling for the information download. For example, when there is an incoming email to a user, the email server sends a signal to the wireless device informing the availability of the email. Upon receiving the signal, the wireless device initiates a polling to start the downloading process. This method is commonly known as "trigger-poll" method, and the signal sent by the email server is generally delivered through Short Message Service (SMS).

There are many shortcomings with the method of polling to initiate data transfer. One shortcoming is that the transfer may not be realized at real time, i.e., the information may stay on a server waiting to be transferred for a long time. Another shortcoming is that network resources may be wasted by repeated polling when there is no information to be transferred.

Accordingly, there is a need for a system and method that allows wireless device users to receive data when it becomes available and without polling. It is thus to such a system and method that the present invention is primarily directed.

SUMMARY OF THE INVENTION

The present invention is a content push method that enables a content provider, such as a email service provider or an Internet service provider (ISP), to deliver data content or emails to a wireless device in a wireless network via an established communication channel. If the communication cannot be established, then the data is delivered via a message to the wireless device.

The content push method involves the wireless device registering with a service node and obtaining a network address, such as an Internet protocol (IP) address. After obtaining the IP address, the wireless device registers itself with a content provider and provides the IP address to the content provider. The content provider associates the email address for the wireless device with the IP address.

When there is an email or other data destined for the wireless device, the content provider requests a communication channel be open between itself and the wireless device. The request is sent to the wireless service provider. The wireless service provider sends the request to the wireless device. If the wireless device does not respond to this request, then the wireless service provider returns a failure message to the content provider. If the wireless device accepts the request, then the communication channel is established and the content provider transmits the data to the wireless device.

If the content provider receives the failure message from the wireless service provider, then the content provider will not stop transmitting the data to the wireless device. Instead, the content provider will enter into a graceful degradation mode, wherein the wireless device will initiate a download request after receiving an indication about the existence of the data. The content provider sends a message indicating the existence of the data via the existing mechanism, such as Short Messaging Service (SMS), provided by the wireless service provider. The message is handled ordinarily by the wireless service provider and delivered to the wireless device. Upon receiving the message, the wireless device opens a communication channel to the content provider and requests downloading of the data.

In one aspect, the invention provides a method for delivering a message to a mobile terminal from a message server, the mobile terminal and message server operating as part of a wireless communication network. The mobile terminal performs the following functions: sending a packet data protocol context request; receiving a response to the packet data protocol context request, which response includes context data comprising a packet data protocol address assigned to the mobile terminal; opening a first socket connection between the mobile terminal and the message server to convey the packet data protocol address; closing the first socket connection; maintaining as active at least part of the context data received in response to the packet data protocol context request. The message server performs the following functions: obtaining the packet data protocol address for the mobile terminal conveyed with the first socket connection between the mobile terminal and the message server; storing the packet data protocol address as being associated with the mobile terminal independent of any socket connection with the mobile terminal; obtaining a message destined for the mobile terminal after the first socket connection is closed; when the stored packet data protocol address is valid for the mobile terminal, opening a second socket connection with the mobile terminal in response to receipt of the message, using the stored packet data protocol address; and transmitting the message to the mobile terminal using the second socket connection.

In another aspect, the invention is an apparatus for a mobile telecommunications network including a server node for serving a mobile terminal with data, the server node comprising a memory having instructions for storing a packet data protocol address obtained from the mobile terminal as a result of a socket connection to the server node initiated by the mobile terminal, and instructions to push data to the mobile terminal by using the stored packet data protocol address to initiate socket connections to the mobile terminal.

In another aspect, the invention is a wireless communication network that has a mobile terminal, a gateway node for providing a connection to a data packet network, a server node for serving the mobile terminal with data, wherein the mobile terminal is operable to obtain a packet data protocol address and to provide the packet data protocol address to the server node via a socket connection and the server node is operable to store the packet data protocol address and to push data to the mobile terminal using the packet data protocol address using socket connections to the mobile device initiated by the server node.

Other advantages and features of the present invention will become apparent after review of the hereinafter set forth Brief Description of the Drawings, Detailed Description of the Invention, and the claims.

DETAILED DESCRIPTION OF THE INVENTION

In this description, the terms "communication device," "wireless device," "wireless telephone," "wireless communications device," "mobile device," "mobile terminal," and "wireless handset" are used interchangeably, and the term "application" as used herein is intended to encompass executable and nonexecutable software files, raw data, aggregated data, patches, and other code segments. Further, like numerals refer to like elements throughout the several views. With advent of $3^{rd}$ generation (3G) wireless communication technology, more bandwidth has become available for wireless communications, and handsets and wireless telecommunication devices, such as cellular telephones, pagers, personal digital assistants (PDAs) have increasing wireless capabilities. The wireless devices are increasingly being used not only for voice communications but also data communications. Now it is common for users to receive emails or to browse the Internet through their handsets.

Figure 1:
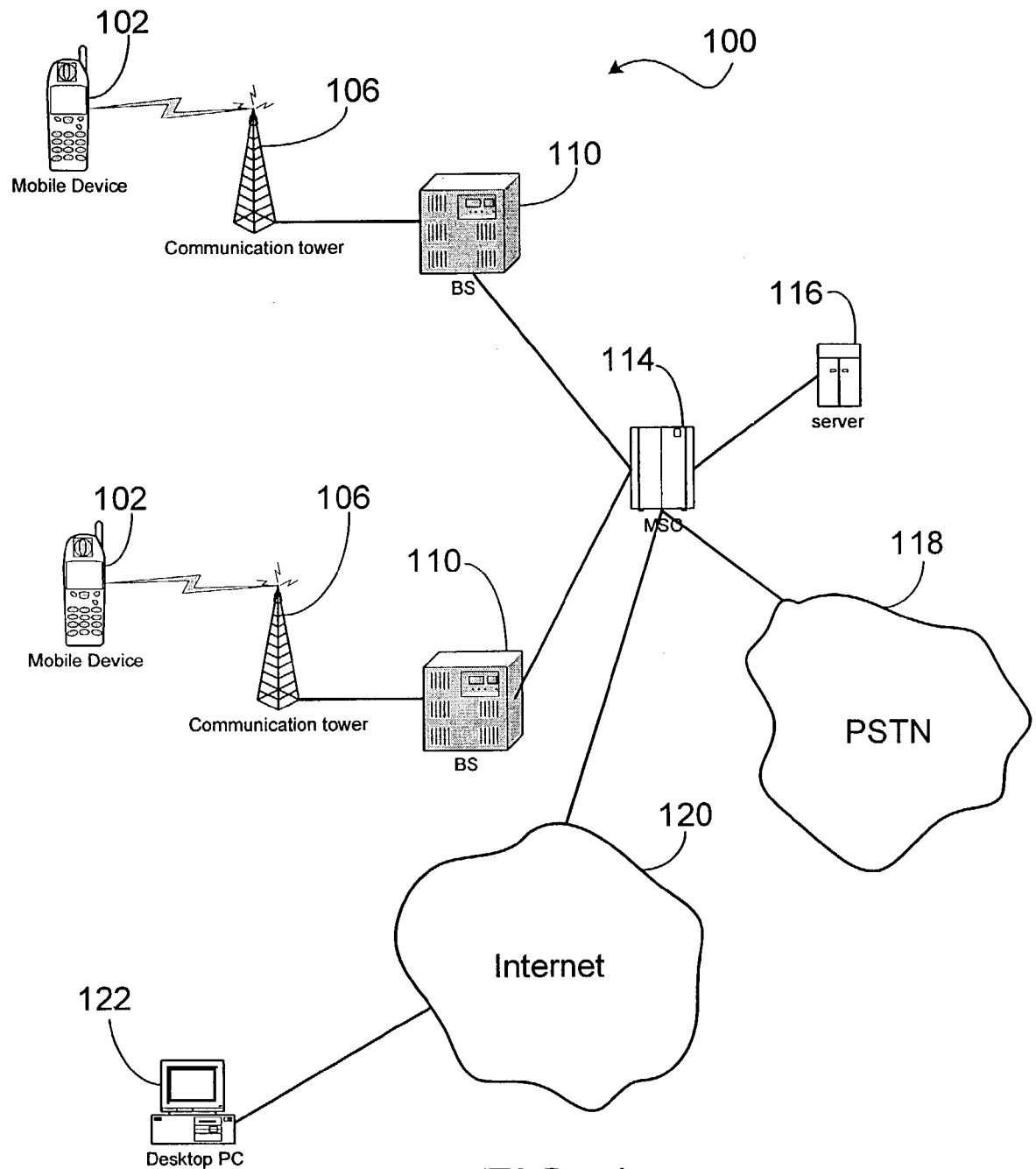
FIG. 1 illustrates a prior art wireless communication network.

FIG. 1 depicts a prior art cellular telecommunication network 100. The communication network 100 includes one or more communication towers 106, each connected to a base station (BS) 110 and serving users with communication devices 102. The communication devices 106 can be cellular telephones, pagers, personal digital assistants (PDAs), laptop computers, or other hand-held, stationary, or portable communication devices that use a wireless and cellular telecommunication network. The commands and data input by each user are transmitted as digital data to a communication tower 106. The communication between a user using a communication device 102 and the communication tower 106 can be based on different technologies, such code division multiplexed access (CDMA), time division multiplexed access (TDMA), frequency division multiplexed access (FDMA), the global system for mobile communications (GSM), or other protocols that may be used in a wireless communications network or a data communications network. The data from each user is sent from the communication tower 106 to a base station (BS) 110, and forwarded to a mobile switching center (MSC) 114, which can be connected to a public switched telephone network (PSTN) 1118 and the Internet 120.

The MSC 114 may be connected to a server 1116 that supports different applications available to subscribers using the wireless communications devices 102. Optionally, the server 116 can be part of the MSC 114. The server 116 can be operated by the wireless service supplier or a third party. The wireless subscribers can be identified by mobile identification number (MIN) or the wireless device's electronic identification number (EIN).

Figure 2:
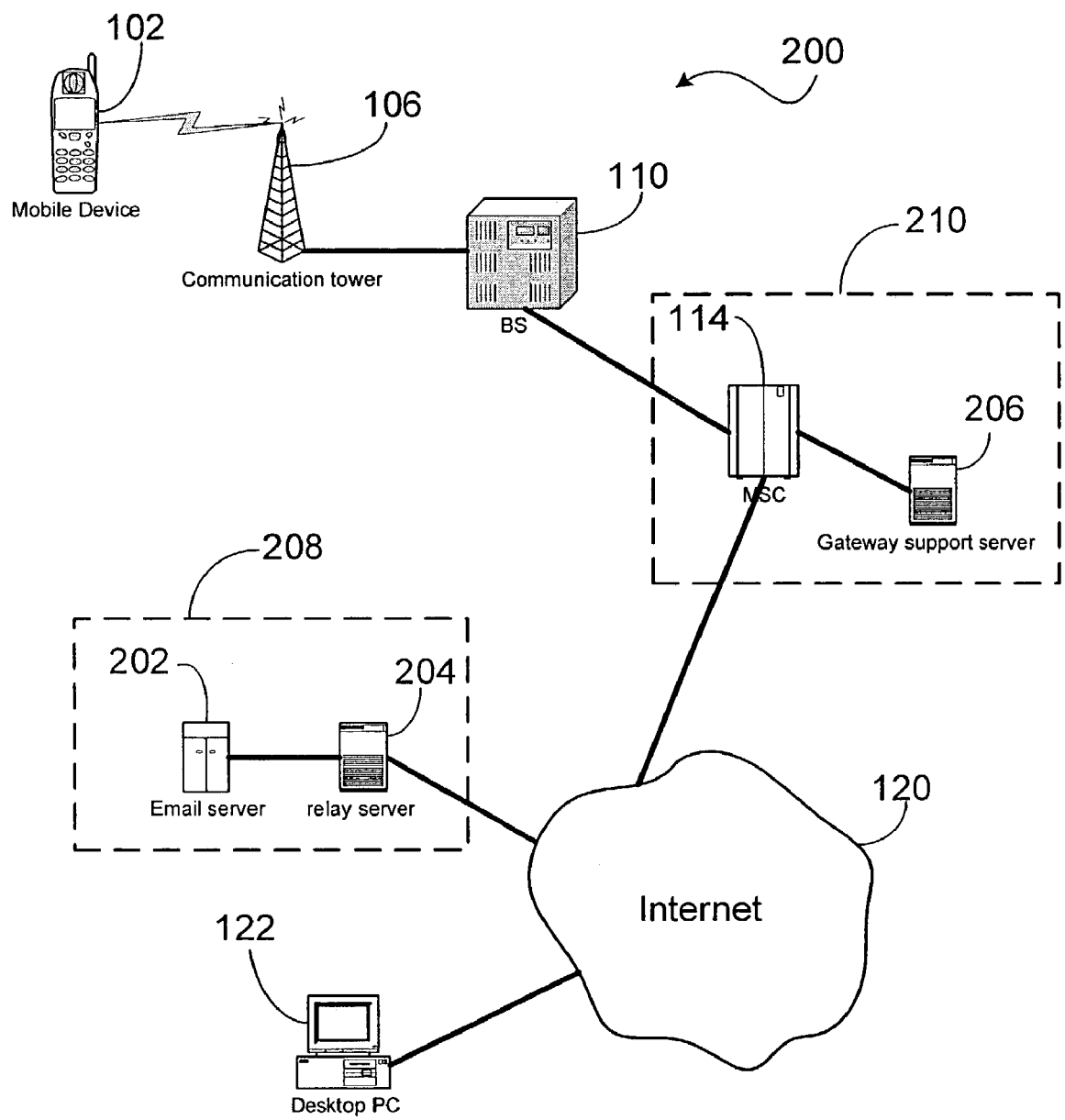
FIG. 2 illustrates a communication network according to the invention.

FIG. 2 depicts a communication network 200 according to one embodiment of the invention. A user at the mobile device 102 may subscribe to an email delivery service and receive emails from an email server 202. The email server 202 may also be known as the message server or content server or data server. The email server 202 is a computer system with instructions for communicating with the mobile device. The email server uses a relay server 204 in its communication with subscribers who use mobile devices 102 as their receiving terminals. The mobile device 102 sends a packet data protocol context request to a gateway support server 206 and receives in response a context data that includes a packet data protocol address (IP address) or a X0.25 protocol address. After receiving the IP address the mobile device 102 opens a socket connection to the email server 202 and provides its IP address and other identification information to the email server 202. After providing the IP address to the email server 202, the mobile device 102 closes the socket, but maintains active the context data.

After the registration, the mobile device 102 will be able to receive emails from a friend sitting at a computer 122 connected to the Internet 120. The email from the computer 122 is received by the email server 202. The email server 202 checks the information of the destination party and sees the email is for a user at the mobile device 102. The email server 202 then sends the email and the user information to the relay server 204 for forwarding to the mobile device 102. The relay server 204 sends a request for opening a communication channel to the IP address of the mobile device 102. The request for opening a communication channel may be a request to open a socket or a port and the request may follow a standard communications protocol.

The request is received by the gateway support server 206, which then forwards the request to the mobile device 102. The mobile device 102 receives the request and responds by acknowledging the request and opens the channel of communication. The acknowledgment is sent to the gateway support server 206, which then forwards it to the relay server 204. The relay server 204 then starts to transmit the email to the mobile device 102 through the communication channel.

If the mobile device 102 does not respond to the request, the gateway support server 206 sends a failure message to the relay server 204, which then will mark the mobile device's IP address as "invalid" and disassociates the IP address with the mobile device 102. Subsequent emails to the same IP address will no longer be delivered through the content push method disclosed herein. Instead, the subsequent emails are delivered through existing mechanisms, such as SMS messages, to the mobile device 102. The IP address will stay "invalid" until the mobile device 102 registers again. When the IP address is not valid, the email server notifies the mobile device about awaiting messages via a message.

The email server may also mark the IP address as invalid, if the mobile device fails to communicate with the email server after a predetermined time. The email server disassociates the mobile device with the IP address. The relay server 204 may be eliminated if its function is incorporated in the email server 202.

Figure 3:
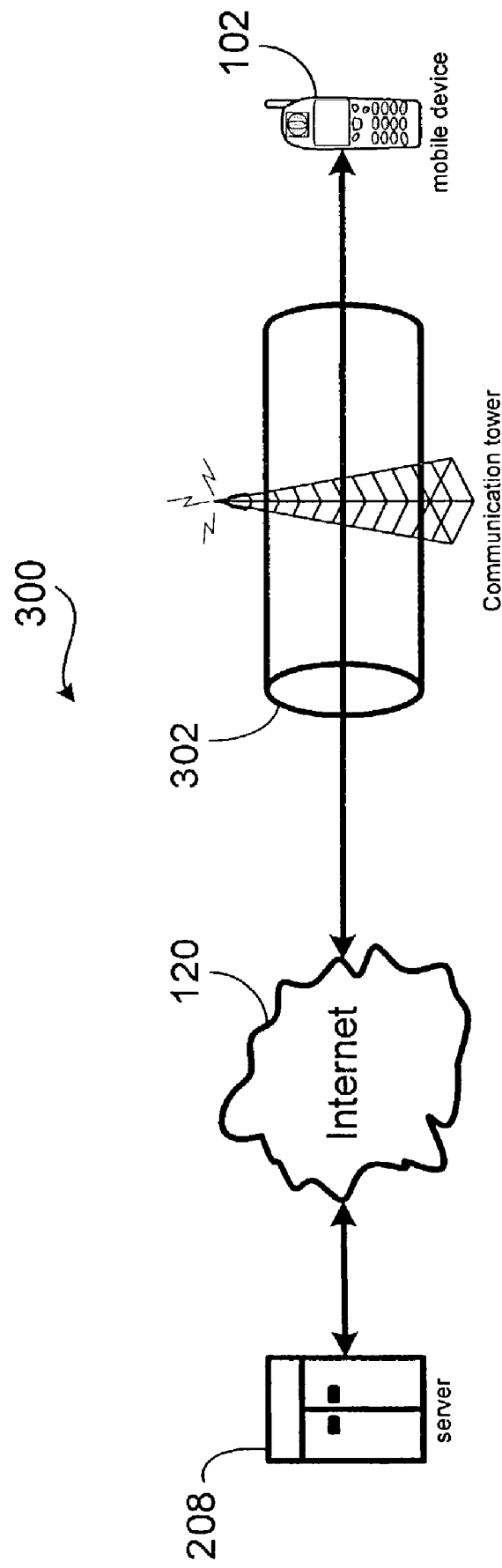
FIG. 3 illustrates a content push model according to the invention.

FIG. 3 is a content push model 300 according to the invention. The mobile device 102 establishes a "pipe" 302 over the wireless service provider's network. The "pipe" may be a packet data protocol (PDP) context. The pipe (PDP context) is used for communication between the mobile device 102 and the server 208. The server 208 communicates with the mobile device 102 by opening a socket via IP address. The mobile device 102 can also open a socket to the server 208.

Figure 4:
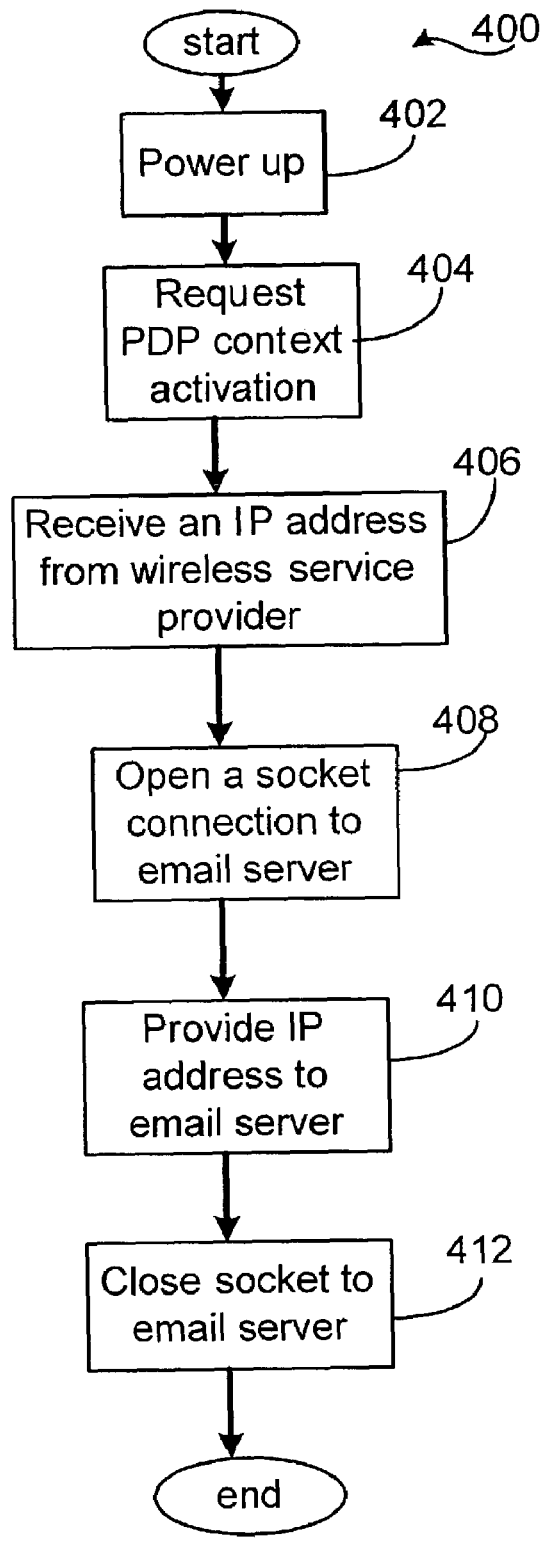
FIG. 4 is a flow chart for a registration process by a mobile device.

FIG. 4 is a flow chart of a registration process 400 for a mobile device 102. After being power up, step 402, the mobile device 102 requests activation of a PDP context, step 404. Though, the description herein uses nomenclatures used by General Packet Radio Service (GPRS) in a GSM network such as activation of a PDP context, the invention is equally applicable to mobile devices in other type of wireless network. Once the PDP context is established, the mobile device 102 receives an IP address or a PDP address from the wireless service provider, step 406.

After obtaining the IP address, the mobile device 102 proceeds to register with the email server 202. The mobile device 102 opens a socket connection to the email server 202, step 408, and provides the IP address and other identification information to the email server, step 410. Other identification information may include the mobile identification number (MIN). After registering with the email server 202, the mobile device 102 closes the socket, step 412. Though, the socket is closed, the mobile device 102 maintains the PDP context and the IP address.

Figure 5:
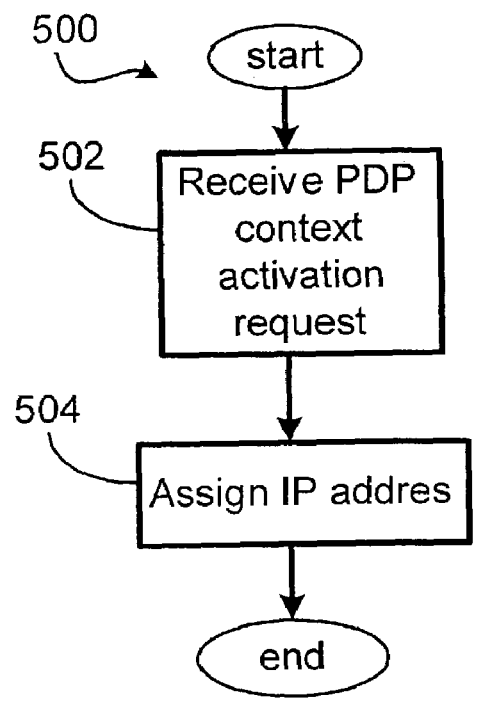
FIG. 5 is a flow chart for a registration process at a gateway support server.

FIG. 5 is a flow chart for a registration process 500 at the gateway support server 206. The gateway support server 206 receives a PDP context activation request, step 502, and assigns an IP address to the mobile device 102, step 504. After assigning the IP address, the connection between the mobile device 102 and the gateway support server 206 is torn down, but the mobile device 102 keeps the IP address. The gateway support server 206 can be part of the wireless network.

Figure 6:
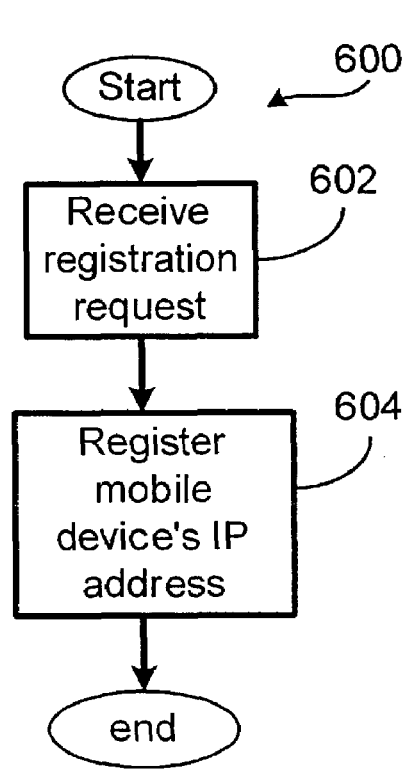
FIG. 6 is a flow chart for a registration process at an email server.

FIG. 6 is a flow chart for a registration process 600 at the email server 202. The email server 202 receives the registration request from the mobile device 102, step 602, and registers the mobile device's IP address along with other identification information, step 604. The information stored by the email server 202 will associate the email address with the IP address and also identify the IP address as belonging to a mobile device.

Figure 7:
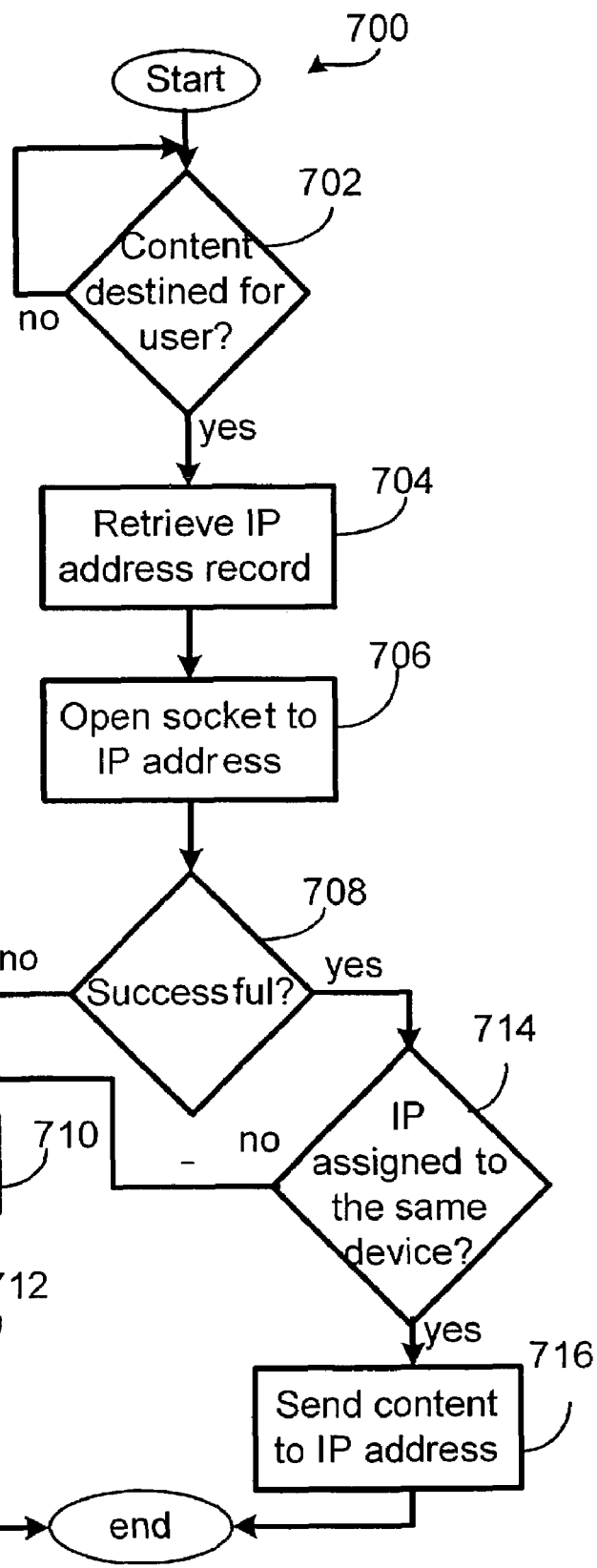
FIG. 7 is a flow chart for a content push process at the email server.

FIG. 7 is a flow chart for a content push process 700. Some of activities of the content push process 700 may occur at the email server 202 and some may occur at the relay server 204. After receiving a content has arrived, the email server checks whether it is for the user at the mobile device 102, step 702. The content can be an email or other information, such as stock quotes or latest breaking news, that the user subscribes. If the content is destined to the user, the email server retrieves a record having the user's information. From the record the email server understands the user is at a mobile device 102 and sends the content with the user information to the relay server 204.

The relay server 204 retrieves the IP address from the user information, step 704, and requests a communication channel be established between the mobile device 102 and the relay server 204. The request is done by sending an open socket request to the IP address, step 706. If the relay server 204 receives an acknowledgement for the open socket request, it means the communication channel has been successfully established. After receiving the acknowledgement, the relay server 204 checks whether the IP address is assigned to the same mobile device 102, step 714, by checking the mobile device 204 information embedded in the response received. The IP address may be reassigned if the mobile device 102 is turned off or no longer responding for some reason. If the IP address is assigned to the same mobile device 102, the relay server 204 then starts to transmit the content to the mobile device 102 at the IP address, step 716. If the open socket to the IP address is unsuccessful, the relay server 204 receives a failure message, the relay server 204 marks the IP address as invalid, step 710, and proceeds to delivery the content by sending a message to the mobile device 102, step 712. The message, which could be a formatted according to Simple Mail Transfer Protocol (SMTP) or Short Message Peer to Peer (SMPP), is delivered through currently available methods, such as SMS messages. If the IP address is assigned to a different mobile device 102, the relay server 204 marks the IP address as invalid, step 710, and proceeds to send a message to the movile device 102, step 712.

Figure 8:
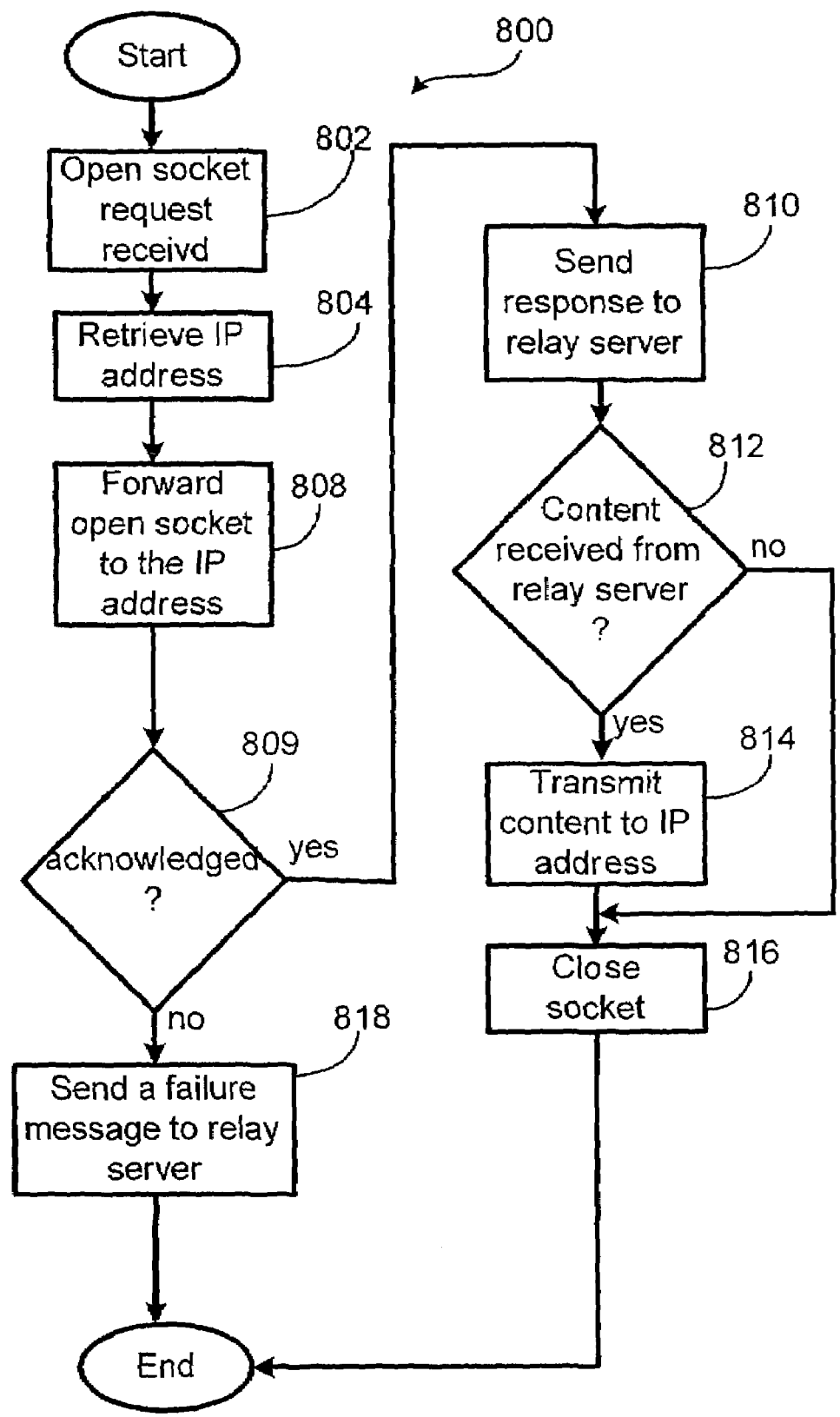
FIG. 8 is a flow chart for a content push process at the gateway support server.

FIG. 8 is a flow chart for a content pushing process 800 at the gateway support server 206. The gateway support server 206 receives the open socket request, step 802, and retrieves the IP address from the request, step 804. The gateway support server 206 forwards the open socket request to the mobile device 102 and establishes the communication channel, step 808. If the gateway server 206 does not receive an acknowledgement from the mobile device 102 within a predefined period, the gateway server 206 sends a failure message to the relay server 204, step 818. If the gateway server 206 receives an acknowledgement from the mobile device 102, the socket is open, and the gateway server 206 sends the acknowledgement to the relay server, step 810. The relay server will check whether the IP address is still assigned to the same mobile device.

If the gateway server receives a content from the relay server, the relay server transmits the content to the IP address, step 814. When the content transmission is finished, the socket is closed, step 816. If the IP address is no longer assigned to the mobile device 102, the gateway support server 206 will not receive any content from the relay server. The gateway server 206 may receive an error message from the relay server indicating failure to establish a communication channel or a time out, and the gateway support server 206 proceeds to close the socket to the IP address, step 816.

Figure 9:
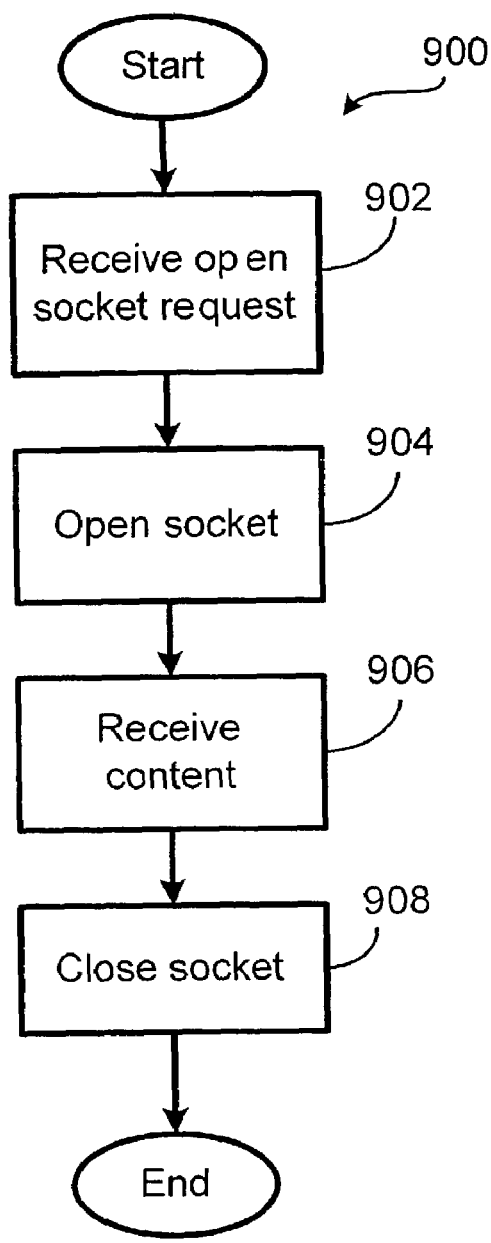
FIG. 9 is a flow chart for a content receiving process at the mobile device.

FIG. 9 is a flow chart for a content receiving process 900 at the mobile device 102. The mobile device 102 receives the open socket request, step 902, and proceeds to open the socket to establish the communication channel, step 904. After the socket is open, the mobile device 102 receives the content, step 906, and closes the socket at the end of receiving procedure, step 908.

Figure 10:
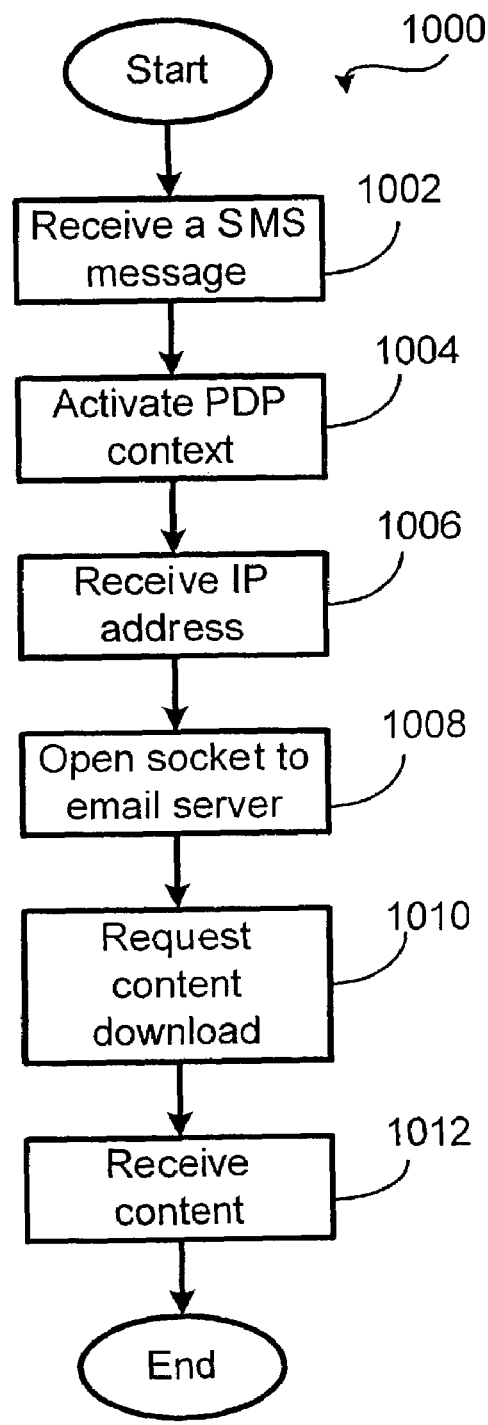
FIG. 10 is a flow chart for a content receiving process during a graceful degradation mode at the mobile device.

FIG. 10 is a flow chart for a content receiving process 1000 during a graceful degradation mode at the mobile device. If for some reason, the mobile device 102 can no longer receive requests at the previously assigned IP address, the mobile device 102 will receive the content in a graceful degradation mode through established mechanisms, such as SMS messages. The mobile device 102 receives a SMS message, step 1002, and proceeds to activate a PDP context, i.e., obtain a new IP address, step 1004. The mobile device 102 receives a new IP address, step 1006, and sends an open socket request to the email server 202, step 1008. The email server 202 responds by opening a socket and establishing the communication channel. The mobile device 102 proceeds to request a content download, step 1010, and receives the content, step 1012. After the content is downloaded, the communication channel is torn down.

The following is a description of a use scenario for the invention. A user purchases a mobile device and subscribes to an instant stock quote service, where a selected set of stock prices will be dispatched to the user's mobile device. Upon powering up the mobile device registers with the wireless service provider by providing its electronic identification number (EIN) and mobile identification number (MIN). The wireless service provider registers the mobile device and assigns an IP address to the mobile device.

After receiving the IP address, the mobile device proceeds to register itself with the instant stock quote service provider. The mobile device opens a communication channel to the stock quote service provider's server (also known as content server) and provides its identification information along with the IP address. The instant stock quote server creates an entry for the user at the mobile device and stores the information about the user and the mobile device.

When the instant stock quote server receives new price for a stock selected by the user, the instant stock quote server retrieves the user's record in preparation to forward the new stock quote to the user. The instant stock quote server retrieves the IP address from the record and sends a request to establish a communication channel to the IP address. The dispatch of the request can be done by the instant stock quote server or by a specialized relay server.

The request to establish a communication channel is sent to a gateway support server in the wireless communication network. The gateway support server checks the IP address and forwards the open socket request to the mobile device.

The mobile device receives the request for establishing a communication channel and acknowledges it. The acknowledgement is sent back to the stock quote server and the communication is established between the stock quote server and the mobile device. The stock quote server then transmits the new stock quote to the mobile device. At the end of transmission, the communication channel is closed.

If the mobile device is roaming in outside of the home area, the mobile device will not be assigned an IP address and the stock quote server will use an existing mechanism to send the information to the mobile device.

The following is an operational description for one aspect of the invention. The terminal device obtains a PDP context data, which includes Packet Data Protocol (PDP) address assigned to the terminal device by a General Packet Radio System resource, in response to a PDP context request from the message server. The terminal device proceeds to establish a communication session with the message server and conveys the PDP address to the message server. The terminal device maintains the PDP context data after expiration of the communication session.

The message server stores the PDP address as associated with the terminal device and uses this PDP address to communicate with the terminal device. When the message server receives data with a destination address that corresponds to the stored PDP address, the message server initiates communication sessions with the terminal device to transmit data. The message server first determines if the stored PDP address is still valid for the terminal device. If the stored PDP address is no longer valid because it has expired for lack of communication with the terminal device, the message server will attempt to transmit the data to the terminal device by first sending a SMS message to the terminal device. The SMS message will initiate a "trigger-poll" action at the terminal device.

In view of the method being executable on a wireless service provider's computer device or a wireless communications device, the present invention includes a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of the invention, the method may be implemented, for example, by operating portion(s) of the wireless network to execute a sequence of machine-readable instructions, such as wireless communications device or the server. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

What is claimed is:

1. A method for transmitting information from a content server to a mobile device in communication with a wireless communications network, wherein the mobile device is assigned to a network address and registered with the content server, comprising the steps of:
   retrieving the network address stored in the content server for the mobile device;
   if the network address is valid, sending a request to open a communication channel to the network address;
   if the request is successful, establishing the communication channel to the mobile device and transmitting the information to the mobile device;
   if the request is unsuccessful, marking the network address as invalid; and
   if the network address is invalid, sending a message to the mobile device indicating the information is available at the content server.

2. The method of claim 1, further comprising the steps of:
   receiving and storing a registration request from the mobile device, wherein the registration request includes the network address; and
   marking the network address received with the registration request as valid.

3. The method of claim 1, further comprising the steps of:
in response to the step of sending the message to the mobile device, receiving a download request from the mobile device; and
upon receiving the download request, downloading the information to the mobile device.

4. The method of claim 1, wherein the message is an SMS message.

5. The method of claim 1, wherein the step of sending the request to open a communication channel to the network address further comprises the step of opening a socket to the network address.

6. The method of claim 1, wherein the network address is an IP address.

7. The method of claim 1, further comprising the step of, if the request is unsuccessful, receiving a failure message.

8. The method of claim 1, wherein the wireless communications network is a GSM network.

9. A method for establishing a communication channel between a content server and a mobile device in communication with a wireless communications network, wherein the mobile device is registered with a gateway server, comprising the steps of:
receiving a registration request from the mobile device at the gateway server;
in response to the registration request, assigning a network address to the mobile device;
storing the assigned network address in the gateway server;
receiving a communication channel request from the content server directed to the network address;
retrieving the network address upon receiving the communication channel request;
forwarding the communication channel request to the mobile device;
if the mobile device acknowledges the communication channel request, sending an acknowledgement to the content server and establishing a communication channel between the mobile device and the content server; and
if the mobile device does not acknowledge the communication channel request, sending a failure message to the content server.

10. The method of claim 9, further comprising the step of receiving an acknowledgement from the mobile device acknowledging the communication channel request.

11. The method of claim 9, wherein the communication channel request is an open socket request.

12. The method of claim 9, wherein the content server is an email server.

13. The method of claim 9, wherein the registration request is an open socket request.

14. The method of claim 9, wherein the network address is an IP address.

15. The method of claim 9, further comprising the step of receiving an identification information from the mobile device, wherein the identification information includes a mobile identification number.

16. The method of claim 9, further comprising the steps of:
receiving a failure message from the content server indicating the communication channel request has failed; and
closing the communication channel to the mobile device.

17. The method of claim 9, further comprising the steps of:
receiving a content from the content server; and
transmitting the content received from the content server to the mobile device.

18. A method for a mobile device to receive information from a content server, the mobile device being in communication with a wireless communications network, comprising the steps of:
sending a first registration request to a gateway server;
in response to sending the first registration request, receiving a network address from the gateway server;
after receiving the network address, sending a second registration request to a content server;
after registering with the content server, receiving an open communications channel request from the gateway server;
in response to receiving the open communications channel sending an acknowledgement to the gateway server; and
after sending the acknowledgement to the gateway server, receiving the information from the content server.

19. The method of claim 18, wherein the step of sending the first registration request further comprises the step of sending identification information to the gateway server, wherein the identification information includes a mobile identification number.

20. The method of claim 18, wherein the step of sending the second registration request further comprises the steps of:
opening a socket to the content server;
after opening the socket, providing the network address to the content server; and
after providing the network address to the content server, closing the socket to the content server.

21. The method of claim 18, further comprising the step of sending a SMS message to the content server.

22. The method of claim 18, wherein the network address is an IP address.

23. A method for delivering a message to a mobile terminal from a message server, the mobile terminal and message server operating as part of a wireless communication network, the method comprising the steps of:
at the mobile terminal:
sending a packet data protocol context request;
receiving a response to the packet data protocol context request, the response including context data with a packet data protocol address assigned to the mobile terminal;
opening a first socket connection between the mobile terminal and the message server to convey the packet data protocol address;
closing the first socket connection after conveying the packet data protocol address; and
maintaining active at least part of the context data received in response to the packet data protocol context request;
at the message server:
obtaining the packet data protocol address for the mobile terminal conveyed with the first socket connection between the mobile terminal and the message server;
storing the packet data protocol address as being associated with the mobile terminal independent of any socket connection with the mobile terminal;
obtaining a message destined for the mobile terminal after the first socket connection is closed;

when the stored packet data protocol address is valid for the mobile terminal, opening a second socket connection with the mobile terminal in response to receipt of the message, using the stored packet data protocol address; and transmitting the message to the mobile terminal using the second socket connection.

24. The method of claim 23, further comprising the steps of, at the message server:

when there is no stored packet data protocol address that is valid for the mobile terminal, transmitting a short message service message to the mobile device notifying the mobile device of an available message; and transmitting the message to the mobile terminal on demand from the mobile device.

25. The method of claim 23, further comprising the step of disassociating the stored packet data protocol address from the mobile terminal after expiration of a predetermined time without communication with the mobile terminal at the message server.

26. The method of claim 23, further comprising the step of disassociating the stored packet data protocol address from the mobile terminal upon receiving a message with information that invalidates the association of the stored packet data protocol address with the mobile terminal at the message server.

27. The method of claim 23, further comprising the step of closing the second socket connection after the step of transmitting the message at the message server.

28. The method of claim 23, wherein the message server is an electronic mail server.

29. The method of claim 23, wherein the packet data protocol address is a selected one of an internet protocol address and an X0.25 protocol address.

30. A method for delivering a message to a terminal device from a data server operating as part of a wireless communication network, the method comprising the steps of:

at the terminal device:

obtaining a Packet Data Protocol (PDP) context data, including a PDP address assigned to the terminal device by a General Packet Radio System resource, in response to a PDP context request;

establishing a communication session with the message server and conveying to the message server the PDP address; and maintaining the PDP context data after expiration of the communication session;

at the data server:

storing the PDP address conveyed by the data server as associated with the terminal device; and initiating communication sessions with the terminal device to transmit data having a destination address corresponding to the stored PDP address until the data server determines that the stored PDP address is no longer valid for the terminal device.

31. The method of claim 30, further comprising the step of, at the data server, disassociating the stored packet data protocol address from the mobile terminal upon the occurrence of at least one of:

(a) the expiration of a predetermined time without communication with the mobile terminal;

(b) failure of an attempt to initiate a communication session with the terminal device using the stored packet data protocol address;

(c) receipt of a message with information that invalidates the association of the stored packet data protocol address with the mobile terminal.

32. The method of claim 31, notifying the terminal device of an awaiting message via a short message service transmission when the stored PDP address is no longer valid for the terminal device.

33. An apparatus for a mobile telecommunications network comprising a server node for serving a mobile terminal with data, the server node comprising a memory having instructions for storing a packet data protocol address obtained from the mobile terminal as a result of a socket connection to the server node initiated by the mobile terminal, and having instructions to push data to the mobile terminal by using the stored packet data protocol address to initiate socket connections to the mobile terminal.

34. The apparatus of claim 33, wherein the server node comprises an electronic mail server.

35. The apparatus of claim 34, wherein the server node operates on a General Packet Radio Service (GPRS) network.

36. The apparatus of claim 35, wherein the server node has software instructions for disassociating the stored packet data protocol address from the mobile terminal upon the occurrence of at least one of:

(a) the expiration of a predetermined time without communication with the mobile terminal;

(b) failure of an attempt to initiate a communication session with the terminal device using the stored packet data protocol address; and (c) receipt of a message with information that invalidates the association of the stored packet data protocol address with the mobile terminal.

37. The apparatus of claim 33, wherein the packet data protocol address is one of an internet protocol address and a X0.25 protocol address.

38. A wireless communication network, comprising:

a mobile terminal;

a gateway node for providing a connection to a data packet network, wherein the gateway node is in communication with the mobile terminal; and a server node for serving the mobile terminal with data, wherein the mobile terminal is operable to obtain a packet data protocol address and to provide the packet data protocol address to the server node via a socket connection, and the server node is operable to store the packet data protocol address and to push data to the mobile terminal using the packet data protocol address using socket connections to the mobile device initiated by the server node.

* * * * *